(No Model.) 2 Sheets—Sheet 2.
B. F. STRICKLER.
MACHINE FOR DRESSING MILLSTONES.
No. 551,563. Patented Dec. 17, 1895.
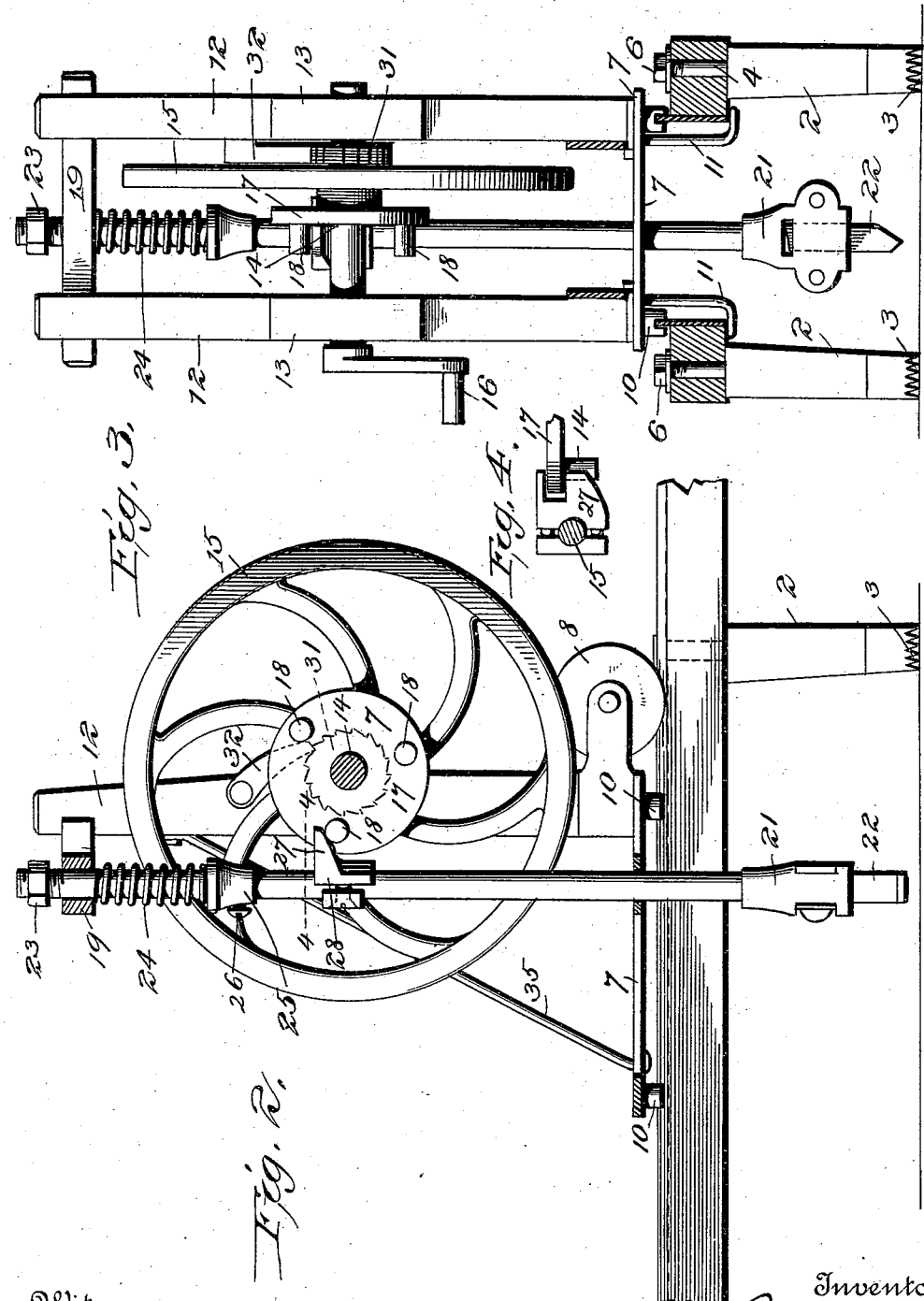
Witnesses
Inventor

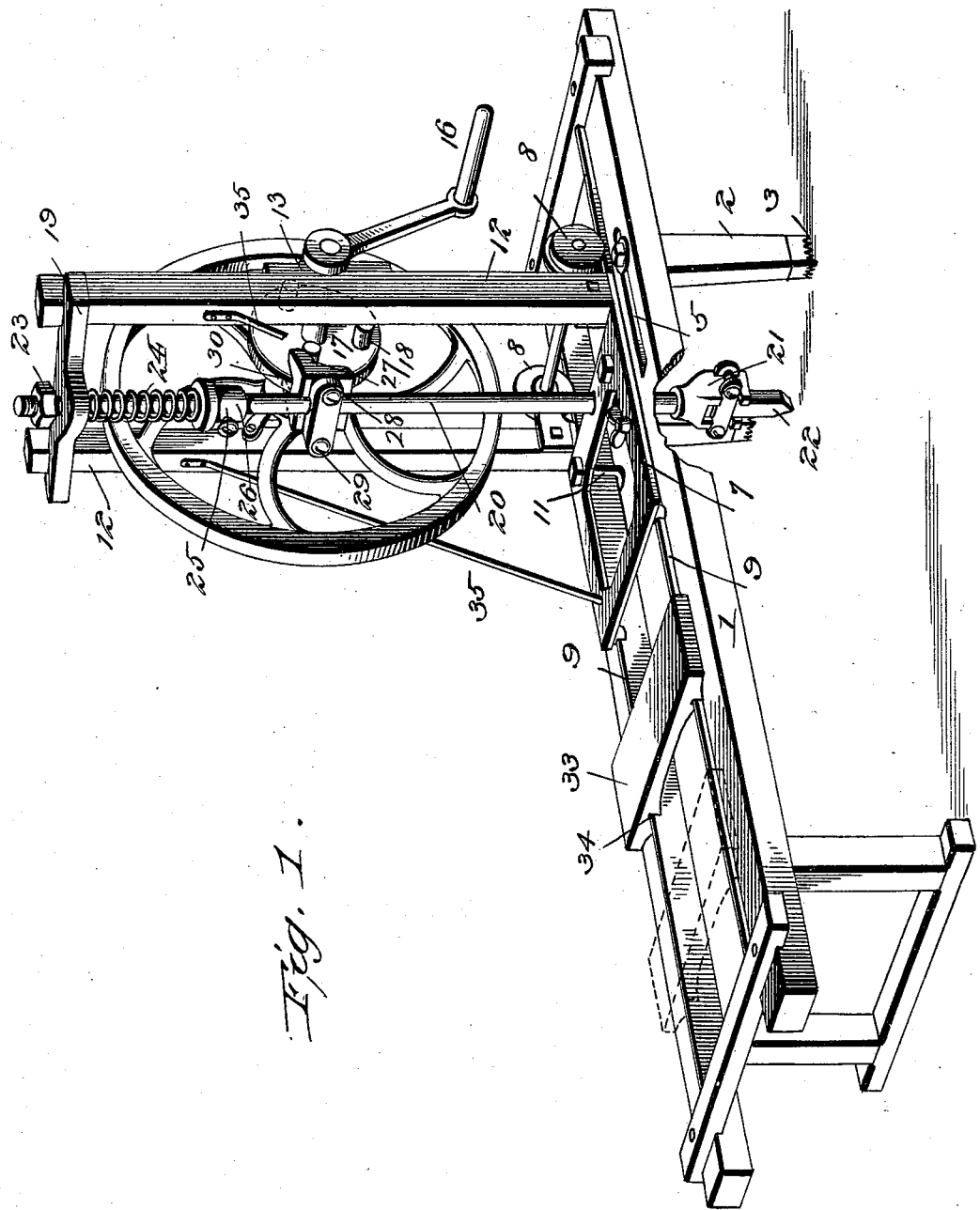

UNITED STATES PATENT OFFICE.

BENJAMIN F. STRICKLER, OF STRICKLER, PENNSYLVANIA.

MACHINE FOR DRESSING MILLSTONES.

SPECIFICATION forming part of Letters Patent No. 551,563, dated December 17, 1895.

Application filed June 3, 1895. Serial No. 551,525. (No model.)

*To all whom it may concern:*

Be it known that I, BENJAMIN F. STRICKLER, a citizen of the United States, residing at Strickler, in the county of York and State of Pennsylvania, have invented certain new and useful Improvements in Machines for Dressing Millstones; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to machines for dressing millstones, and like purposes, and has for its object to provide simple and efficient means for preventing the pick-bar from turning; also to support and prevent the pick-bar from dropping while the machine is being moved or shifted from one point or application of use to another; also to enable the frame of the machine to be practically shortened or lengthened so as to adapt it to fit and rest upon stones of different sizes; and also to generally simplify and improve the construction of the machine with the view of increasing its efficiency.

To the accomplishment of the foregoing and such other objects as may hereinafter appear, the invention consists in the construction and in the combination of parts hereinafter particularly described and then sought to be specifically defined by the claims, reference being had to the accompanying drawings, forming a part hereof, and in which—

Figure 1 is a perspective of the machine with parts broken away. Fig. 2 is a vertical longitudinal section through the machine with parts in full lines. Fig. 3 is a vertical cross-section through the machine, looking from the front thereof; and Fig. 4 is a detail plan view showing the lug clamped to the pick-bar with which the lifting-pins engage.

In the drawings the numeral 1 designates the frame of the machine, the front legs 2 of which are provided with claws or teeth 3 on the end thereof so that when the machine is placed on top of a stone said teeth will prevent the machine from slipping. The upper ends of these legs 2 are formed with pins or extensions 4 which pass upwardly through longitudinally-extending slots 5 made in the sides of the frame so as to permit the legs to be shifted back and forth and thus practically shorten or lengthen the frame so that it is adapted to rest upon stones of different dimensions, said legs being held in their adjusted positions by means of nuts 6 screwed onto the ends of the pins or extensions 4, or otherwise.

The numeral 7 designates a bed-plate or carriage provided with wheels 8 at one end, which travel upon rails 9 secured to and projecting above the top of the side timbers of the frame. This plate or carriage is prevented from being accidentally lifted from the frame by means of hook-bolts 11, which pass through the bed-plate 7 and have their lower outwardly-turned ends extending beneath the side timbers of the frame, as clearly illustrated in Figs. 1 and 3 of the drawings, and from the under side of the plate or carriage 7 extend studs or bosses 10 which are slotted or grooved, as shown in Fig. 3, so as to straddle the top of the rails 9, and thus serve to guide the carriage or plate in its backward and forward travel over said track-rail. To the forward portion of the carriage 11 are secured the standards 12 which sustain the operating mechanism of the machine. In suitable boxes 13 of these standards is journaled a horizontal shaft 14 carrying the fly-wheel 15 and operating-crank 16, and also having secured to it a wheel or disk 17, from the side face of which project a series of pins 18. Through the plate or carriage 7 and a transverse bar 19 at the upper part of the standard extends the pick-bar 20 which has a vertical movement. This pick-bar carries at its lower end by suitable clamping device 21 the pick or other tool 22, and an adjustable nut 23 on top of the pick-bar 20 regulates the throw or extent of drop of the pick-bar. The pick-bar is encircled by a coil-spring 24, the tension of which is regulated by a sliding collar or sleeve 25 which is set to its adjustment by a set-screw 26, which spring forces down the pick-bar with more or less force according to the tension of the spring 24 after the pick-bar has been raised the desired height and released. The pick-bar is raised successively by the series of pins 18 on the wheel or disk 17 coming in contact with a lug or tooth 27 which forms a portion of a two-part clamp 28 secured at the desired point on the pick-bar 20 by screws 29, or otherwise. This clamp has formed in its face next to the disk or wheel 17 a groove or recess 30 in which the peripheral edge of said wheel or disk fits, so as to prevent the pick-bar from turning, and in that way the accurate working of the tool 22 is insured.

At times it is desirable to hold the tool 22 from out of engagement with the stone being dressed during the shifting of the position of the machine and at other times. For the purpose of enabling this to be done, I affix a ratchet 31 to the shaft 14 and suitably pivot a pawl 32 to engage therewith, which pawl slips over the ratchet in the rotation of the shaft 14 during the period of operating the pick-bar, but which will prevent the backward rotation of the shaft and disk or wheel 17, so that when the pick-bar has been raised nearly to the limit of the upward movement by engagement of one of the teeth 18 with the lug or tooth 27, as illustrated in Fig. 2 of the drawings, the forward rotation of the shaft and wheel may be stopped at that point and the pawl 32 thus be caused to hold the wheel or disk 17 in such position that the pick-bar will be held up and the two kept out of engagement with the stone being dressed. It will thus be observed that the joint action of the pawl and ratchet and a pin on the disk or wheel 17 will coact to hold up the pick-bar when desired.

The numeral 33 designates a seat for the operator, which seat fits upon the track-rail 9 and can slide thereon to the position desired, the groove 34 in the under face of the seat and into which the track-rails enter preventing the seat from slipping sidewise.

The carriage will ride smoothly over the raised track-rails 9 and can be easily shifted to any extent desired by a slight pressure from the hand, thus enabling the pick-bar and tool to be readily shifted from point to point as occasion may require.

The numerals 35 designate brace-bars which connect the standards 12 to the bed-plate or carriage 7.

The construction above described produces a stone-dressing machine composed of comparatively few parts, each simple in construction, and all arranged for joint action, so as to produce a most efficient machine for the purposes specified, strong, durable, and efficient in all parts and for its purposes.

I have described what I consider to be the best construction of each of the parts illustrated; but it is obvious that changes can be made in the details and the essential features of my invention be still employed.

Having described my invention and set forth its merits, what I claim is—

1. In a mill stone dressing machine, the combination with the frame for sustaining the operating mechanism, and having slots formed in its sides, of the depending legs having their upper portions fitting in said slots and adustable therein lengthwise of the frame, and means for securing said legs in their adjustment whereby the legs may be adjusted to support the frame on various dimensions of stone without changing the height of the frame, substantially as and for the purposes described.

2. In a mill stone dressing machine, the combination with the frame having raised track rails, of the bed plate or carriage, vertical standards located at the forward end thereof for sustaining the operating mechanism, forwardly extending arms located at the lower ends of said standards, wheels journaled in said arms to travel on said rails, braces extending from the rear of said bed plate to said standards, slotted studs projecting from the under side of the bed plate and straddling the track rails, and hooked bolts passed through the bed plate so as to lie against the inside faces of the side of the frame and having their lower ends turned outwardly under the sides of the frame, substantially as and for the purposes described.

3. In a mill stone dressing machine, the combination with the disk or wheel having pins projecting from its face, of the pick-bar provided with a clamp having a tooth or lug to be engaged by said pins and formed with a groove or recess to receive the peripheral edge of the disk or wheel, substantially as and for the purposes described.

4. In a mill stone dressing machine, the combination with the operating disk or wheel having pins projecting laterally from its face, of the pick-bar carrying a tooth lying to one side of said disk and projecting between and adapted to be engaged by said pins, a ratchet wheel located upon the shaft of said disk, and a pawl to engage said ratchet wheel for holding one of said pins beneath and in engagement with said tooth in the elevated position of the pick-bar for the purpose of securing the tool of the pick-bar above and out of engagement with the stone to be dressed and prevent the backward movement of the disk, substantially as and for the purposes described.

In testimony whereof I affix my signature in presence of two witnesses.

BENJAMIN F. STRICKLER.

Witnesses:
 BYRD H. THOMAS,
 GEO. S. YEAPLE.